US012673328B2

(12) United States Patent
Zeng et al.

(10) Patent No.: US 12,673,328 B2
(45) Date of Patent: Jul. 7, 2026

(54) COLLOID MILL

(71) Applicant: Bühler AG, Uzwil (CH)

(72) Inventors: Yuantong Zeng, Uzwil (CH); Konstantinos Paggios, Kreuzlingen (CH)

(73) Assignee: Bühler AG, Uzwil (CH)

( * ) Notice: Subject to any disclaimer, the term of this patent is extended or adjusted under 35 U.S.C. 154(b) by 225 days.

(21) Appl. No.: 18/550,224

(22) PCT Filed: Mar. 17, 2022

(86) PCT No.: PCT/EP2022/025109
§ 371 (c)(1),
(2) Date: Sep. 12, 2023

(87) PCT Pub. No.: WO2022/194428
PCT Pub. Date: Sep. 22, 2022

(65) Prior Publication Data

US 2024/0165629 A1 May 23, 2024

(30) Foreign Application Priority Data

Mar. 18, 2021 (EP) ..................................... 21163463

(51) Int. Cl.
*B02C 7/00* (2006.01)

(52) U.S. Cl.
CPC ..................................... *B02C 7/00* (2013.01)

(58) Field of Classification Search
CPC .. B02C 7/175; B02C 7/00; B02C 7/08; B02C 7/12; A23G 1/0026; A23G 1/0033; A23G 1/12; A23G 1/125
See application file for complete search history.

(56) References Cited

U.S. PATENT DOCUMENTS 3,806,050 A * 4/1974 Cumpston, Jr. .......... D21D 1/22 241/298
2013/0105607 A1* 5/2013 Yoshikawa .......... B02C 13/288 241/57

FOREIGN PATENT DOCUMENTS

| | | | | |
|---|---|---|---|---|
| CA | 974980 | A | 9/1975 | |
| CN | 2291205 | Y | 9/1998 | |
| CN | 207805709 | U | 9/2018 | |
| DE | 4433039 | A1 | 3/1996 | |
| EP | 0122608 | A2 | 10/1984 | |
| EP | 0497526 | A2 | 8/1992 | |
| EP | 0605169 | A1 | 7/1994 | |
| EP | 0775526 | A1 | 5/1997 | |
| EP | 1207432 | A2 * | 5/2002 | ............ B02C 13/10 |

* cited by examiner

*Primary Examiner* — Bobby Yeonjin Kim
(74) *Attorney, Agent, or Firm* — Colson Law Group, PLLC

(57) ABSTRACT

A colloid mill for reducing a particle size of particles having a rotor and a stator, which are arranged coaxially one inside the other. The colloid mill has a material inlet for introducing a suspension or emulsion on a first axial side and a product outlet for conducting away the suspension or emulsion on a second axial side. The rotor has a rotor grinding surface, and/or the stator has a stator grinding surface. The rotor grinding surface has a grinding tooth with a shearing surface and/or shearing edge, the cross-sectional surface of which grinding tooth tapers, in a plane perpendicular to the axis of rotation, wherein the cross-sectional surface has a first leg, which adjoins a base side and encloses an angle with the base side.

10 Claims, 11 Drawing Sheets

COLLOID MILL

The invention relates to a colloid mill, a system for processing fat-based masses, a method for reducing a particle size of solids suspended in a first liquid, and/or a droplet size of a second liquid emulsified in a first liquid, a rotor and a stator.

Colloidal mills for dispersing solid and liquid substances in the colloid mills in colloidal fineness by means of a mechanical force or for emulsifying liquids in liquids are known from the prior art.

For example, solid substances, such as sugar, milk powder, nuts, fruits or kernels are finely distributed in fat-containing masses, for example containing cocoa butter. The solid and liquid substances added to the colloid mill are referred to as material in the context of this application.

Known colloid mills essentially comprise a cylindrical or conical housing with a vertical axis. They have a material inlet on one axial side and a product outlet on the opposite axial side. Colloidal mills comprise a cylindrical or conical stator, which is typically mounted on or integrally formed with the inner wall surface of the housing, and a coaxially arranged rotor, typically within the stator with a vertical rotating shaft that is rotatably supported by the housing and supports the rotor fixedly and coaxially.

In the context of this invention, the terms "radial," "axial," "direction of rotation," and "in the circumferential direction" refer to the axis of rotation of the rotor of the colloid mill.

The outer surface of the rotor and the inner surface of the stator are each provided with mutually opposite grinding teeth designed as ribs, which are interspersed with depressions arranged alternately therebetween, wherein the ribs and depressions extend substantially in the axial direction and have a substantially rectangular shape in cross section.

A pulverizer designed with such a geometry is shown, for example, as prior art in EP0122608A2.

In order to improve throughput and comminution performance, colloid mills have been provided with grinding teeth, the cross section of which is saw-tooth-shaped in a plane perpendicular to the axis of rotation, i.e., has an approximately trapezoidal or triangular cross section.

Grinding devices with such geometries are disclosed, for example, in CN 2291205Y, EP0775526A1, EP0605169 A1, EP0497526 A2 and EP0122608A2.

The flat flanks of the grinding teeth compared to the rectangular shape provide more space for the product and can therefore lead to increased throughput.

It has been shown that during processing in a colloid mill, significant heating of the processed material occurs, which can have a negative effect on the product, in particular if it is a heat-sensitive food product or a pharmacological product.

It is therefore the object of the invention to overcome the disadvantages of the known art and, in particular, to provide a colloid mill, a system, a method, a rotor and a stator, which allow efficient comminution under the lowest possible temperature increase.

The object underlying the invention is achieved by a colloid mill, a system, a method, a rotor, and a stator according to the independent claims.

The colloid mill according to the invention serves to reduce a particle size of particles suspended in a first liquid, and/or a droplet size of a second liquid emulsified in a first liquid, wherein the first liquid is in particular a fat-based mass.

The fat-based mass may be fat or oil. The fat-based mass contains, in particular, cocoa butter.

The particles may be solids, such as sugar particles, nuts, fruits and/or kernels. The particles experience wet grinding in the colloid mill.

The particles may be fat-containing in such a way that no liquid needs to be added, and the decreasing particles are emulsified in their own fat, which can be considered as the first liquid.

The colloid mill has at least one rotor and at least one stator, which are arranged coaxially one inside the other. Preferably, the rotor is arranged within the stator or can be attached within the rotor.

Alternatively, it is also conceivable for the rotor to rotate about the stator.

The rotor may have a rotatable shaft or may be connectable to a rotatable shaft which is set into rotation by a drive device.

The colloid mill preferably has at least one material inlet for introducing particles, a liquid, a suspension and/or emulsion on a first axial side and at least one product outlet for conducting away the suspension or emulsion on a second axial side. The material to be processed can thus flow through the colloid mill in the axial direction.

The material inlet can be funnel-shaped so that the material enters the grinding chamber between the rotor and the stator under the influence of gravity.

The at least one rotor has a rotor grinding surface facing or to be faced toward the stator, and/or the at least one stator has a stator grinding surface facing or to be faced toward the rotor.

The rotor grinding surface has at least one grinding tooth with a shearing surface and/or shearing edge, the cross-sectional surface of which grinding tooth tapers, in a plane perpendicular to the axis of rotation, in the radial direction toward the stator grinding surface opposite or to be arranged opposite thereto.

A grinding tooth is a raised region which protrudes from a bottom surface of the rotor or stator.

The raised region has a surface and/or an edge which, in the mounted state, has a shortest distance to the opposite grinding surface. This surface and/or the edge ensure the shearing of the material and therefore form the shearing surface and/or shearing edge.

The cross-sectional surface has a first leg, preferably a straight first leg, which adjoins a base side, running in the circumferential direction, of the cross-sectional surface. The first leg points in the direction of rotation of the rotor. This means that the first leg delimits that side of the cross-sectional surface that points toward the direction of rotation. When the rotor rotates, the first leg is moved against the material located in the colloid mill.

Preferably, the first leg is located on a side surface of the grinding tooth that points in the direction of rotation of the rotor.

The first leg and the base side enclose an angle that is in a range of 80°-100°, preferably 85°-95°. The base side is preferably located on a circle around the axis of rotation.

Preferably, the first leg is located on a radial line through the axis of rotation and encloses a right angle with the base side.

Alternatively or additionally, the stator grinding surface has at least one grinding tooth with a shearing surface and/or shearing edge, the cross-sectional surface of which grinding tooth tapers, in a plane perpendicular to the axis of rotation, in the radial direction toward the rotor grinding surface opposite or to be arranged opposite thereto.

The cross-sectional surface has a second leg, preferably a straight second leg, which adjoins a base side, running in the circumferential direction, of the cross-sectional surface. The second leg points away from the direction of rotation of the rotor. This means that the second leg delimits that side of the cross-sectional surface that points away from the direction of rotation. During a rotation of the rotor, material that is also moved can thus flow against the second leg.

The second leg is preferably located on a side surface of the grinding tooth that points away from the direction of rotation of the rotor.

The second leg and the base side enclose an angle that is in a range of 80°-100°, in particular of 85°-95°. The base side is preferably located on a circle around the axis of rotation.

Preferably, the second leg is located on a radial line through the axis of rotation and encloses a right angle with the base side.

The angle between the leg and the curved base side is formed between the leg and the tangent that rests against the base side at the intersection of the leg and the base side.

Since the cross-sectional surface of the grinding tooth on the rotor and/or stator tapers radially, an asymmetrical cross-sectional surface results. There is no radial line with respect to which there is mirror symmetry of the cross-sectional surface. The cross-sectional surface of the grinding tooth on the rotor and/or stator has a steep flank, namely as a result of the leg, which encloses an angle of 85-95° with the base surface, and a flat flank.

Preferably, the rotor grinding surface and/or the stator grinding surface have a plurality of grinding teeth, which have the same distances, in particular in the circumferential direction.

The tapering of the cross-sectional surface causes the rotor and stator to come very close to one another only on a comparatively small part of the circumferential surface. The shearing forces between rotor and stator are therefore smaller than in a colloid mill with conventional rectangular grinding-tooth cross-sectional surfaces.

The material therefore heats less.

At the same time, the steep flanks ensure effective comminution.

Rotor and stator can be designed such that the rotor grinding surface and the stator grinding surface are substantially cylindrical or conical. The colloid mill can be designed such that the axis of rotation is arranged vertically during operation and the colloid mill can be flowed through from top to bottom.

The radius of the grinding gap between the rotor and the stator may increase in the flow direction, in particular downward.

The grinding tooth or teeth may be designed as ribs and run or be inclined along the stator grinding surface and/or rotor grinding surface in the axial direction on the shortest path.

In the case of inclined grinding teeth, the longitudinal extension of the rib encloses an angle of not equal to 90° with a circumferential line perpendicular to the axis of rotation or with the direction of rotation.

Inclined grinding teeth promote the transport of the material through the colloid mill.

The colloid mill may have two or more portions of different inclinations of the grinding teeth in the axial direction. The degree of inclination and/or the inclination direction may change from one portion to the next portion.

On the circumference in the axial direction, the colloid mill may have two or more portions of different sizes and/or densities of the grinding teeth.

The colloid mill preferably has one, two or three portions.

On the side of the material inlet, the colloid mill may have an axial portion in which the rotor has no rotor grinding surface closed in the circumferential direction. In this region, the rotor surface may have arms pointing in the axial direction, for example three or more arms on which grinding teeth can be located.

The colloid mill preferably has a drive device which ensures a rotor revolution of 2500-3500 rpm, in particular 2900-3000 rpm, at a frequency of 50 Hz.

In an advantageous embodiment, the cross-sectional surface of at least one grinding tooth forms a polygon, in particular a quadrilateral, which has a longer base side, which runs in the circumferential direction, and a shorter base side, which is parallel to the first base side.

In this case, the cross-sectional surface is approximately trapezoidal.

The shorter base side is preferably located on a circle around the axis of rotation, thus points in the radial direction. The shorter base side of the cross-sectional surface is located on a shearing surface of the grinding tooth.

The shorter base side has a distance from a bottom line which forms a circle around the axis of rotation and on which the larger base side is located.

Alternatively or additionally, the cross-sectional surface of at least one grinding tooth forms a polygon, in particular a triangle, the tip of which points to the opposite grinding surface or grinding surface to be arranged opposite thereto. The tip of the triangle is located on a shearing edge of the grinding tooth.

A tip is a corner of the polygon at which the adjacent sides enclose an angle of less than or equal to 90°.

The triangle can be a right-angled triangle, wherein the hypotenuse forms a flat flank of the grinding-tooth cross-sectional surface.

Alternatively, other cross-sectional surfaces are also conceivable, in particular ones that have a longer base side, which is located on a bottom line of the grinding surface, and a shorter base side, which is spaced apart therefrom, in particular runs parallel to the longer base side, and is located on a shearing surface, or ones that have a tip pointing in the radial direction.

The cross-sectional surface may, for example, be pentagonal or polygonal. The flatter flank of the grinding tooth may be beveled.

The at least one grinding tooth of the rotor grinding surface and/or stator grinding surface is preferably designed as a rib in which the size of the cross-sectional surface along its longitudinal extension remains constant.

Alternatively or additionally, cross-sectional surfaces may change their size along the flow direction, for example in the flow direction, i.e., in a direction from the material inlet to the product outlet.

In the flow direction, the ribs then increasingly occupy space between the stator and the rotor so that the passage area for the material decreases in the flow direction in a plane perpendicular to the axis of rotation.

The shortest distance between the rotor grinding surface and the stator grinding surface may be in a range of 0.05 mm to 1.2 mm.

The shortest distance can be considered as the width of a grinding gap between the rotor and the stator.

The shortest distance between the rotor grinding surface and the stator grinding surface is located between the shearing surface or shearing edge of the rotor and the shearing surface or shearing edge of the stator.

Preferably, the shortest distance between the rotor grinding surface and the stator grinding surface is located in a plane perpendicular to the axis of rotation between the shorter base side of a quadrangular cross-sectional surface or the tip of a triangular cross-sectional surface on the grinding tooth of the stator grinding surface and the shorter base side of a quadrangular cross-sectional surface or the tip of a triangular cross-sectional surface on the grinding tooth of the rotor grinding surface.

The shortest distance may remain constant in the axial direction or change, for example decrease, in the axial direction.

The shortest distance may remain constant during the processing. The grinding gap may be variable, for example by a mutual axial displacement of the rotor and stator.

In the case of a colloid mill with a cross-sectional surface of a grinding tooth of the rotor grinding surface and of the stator grinding surface with a shorter base side that runs parallel to a longer base side located on the bottom line, the value of a shearing surface rate (SSR) can be less than 0.25, in particular less than 0.07.

The value of the shearing surface rate (SSR) indicates the product of the proportion of the smaller base sides of the cross-sectional surfaces of grinding teeth of the rotor grinding surface in the circumference of a circle formed by a bottom line of the rotor grinding surface around the axis of rotation, and the proportion of the smaller base sides of the cross-sectional surfaces of grinding teeth on the stator on the circumference of a circle formed by the bottom line of the stator grinding surface around the axis of rotation.

A shearing surface rate (SSR) can be calculated for all rotors and stators that have a shearing surface pointing in the radial direction. Their grinding teeth have a cross-sectional surface with a base side spaced apart from a bottom line and pointing in the radial direction.

The bottom line connects the cross-sectional surfaces of the grinding teeth. For example, the longer base sides of cross-sectional quadrilaterals are located on the circle formed by the bottom line.

The smaller the value of the shearing surface rate (SSR) is, the smaller is the region in the colloid mill in which shearing takes place and the less heated is the material.

The colloid mill may have a housing that is fixedly connected to the stator. The colloid mill may alternatively have a housing, wherein the stator and the housing are not manufactured in one piece and the stator is in particular exchangeable. The stator may be formed as a stator inner casing, which can be removed from the housing and exchanged. After wear, the stator can, for example, be removed and replaced by a new or refurbished stator in the same housing.

It may also be provided that the rotor is provided as an exchange part. For this purpose, the rotor grinding surface may be formed on a rotor casing which can be exchangeably fastened to the rotor shaft. Alternatively, the rotor may be dismantled and exchanged together with the shaft.

The object underlying the invention is also achieved by a system for processing food masses, preferably containing fat-based masses. The system comprises a colloid mill as described above. The colloid mill is in particular arranged upstream of a ball mill, and/or the colloid mill is in particular arranged downstream of a mixer.

The system may have a conche which may be placed before or after the colloid mill in the process direction.

The object underlying the invention is also achieved by a method for reducing, in a colloid mill as described above, the particle size of particles suspended in a first liquid, and/or the droplet size of a second liquid emulsified in a first liquid, wherein the first liquid is in particular a fat mass.

In the process, in order to form a suspension or emulsion, material is conducted along between the rotor grinding surface and the stator grinding surface, from a first axial end of the colloid mill to the second axial end of the colloid mill.

On the path through the colloid mill, the temperature of the material increases by less than 40° C.

The area between the cross-sectional surfaces of two circumferentially adjacent grinding teeth on the stator grinding surface and/or the rotor grinding surface in a plane perpendicular to the axis of rotation can provide space for the cross-sectional surfaces of 3-10 particles and/or droplets, as are added to the colloid mill.

The object underlying the invention is also achieved by a rotor for a colloid mill as described above, wherein the rotor has a rotor grinding surface to be faced toward a stator.

The rotor grinding surface has at least one grinding tooth with a shearing surface and/or shearing edge, the cross-sectional surface of which grinding tooth tapers, in a plane perpendicular to the axis of rotation, in the radial direction toward the stator grinding surface opposite thereto in the mounted state.

The cross-sectional surface has a first leg, preferably a straight first leg, which adjoins a base side, running in the circumferential direction, of the cross-sectional surface. The first leg points in the direction of rotation of the rotor, which direction is provided in the mounted state. The first leg encloses an angle of 80°-100°, preferably 85-95°, with the base side.

The object underlying the invention is also achieved by a stator for a colloid mill as described above, wherein the stator has a stator grinding surface to be faced toward the rotor. The stator grinding surface has at least one grinding tooth with a shearing surface and/or shearing edge, the cross-sectional surface of which grinding tooth tapers, in a plane perpendicular to the axis of rotation, in the radial direction toward the rotor grinding surface opposite thereto in the mounted state. The cross-sectional surface has a second leg, preferably a straight second leg, which adjoins a base side, running in the circumferential direction, of the cross-sectional surface and points counter to the direction of rotation of the rotor, which is provided in the mounted state. The second leg encloses an angle of 80°-100°, preferably 85-95°, with the base side.

The invention is explained below with reference to the description of specific embodiments and the corresponding drawings.

Figure 6A:
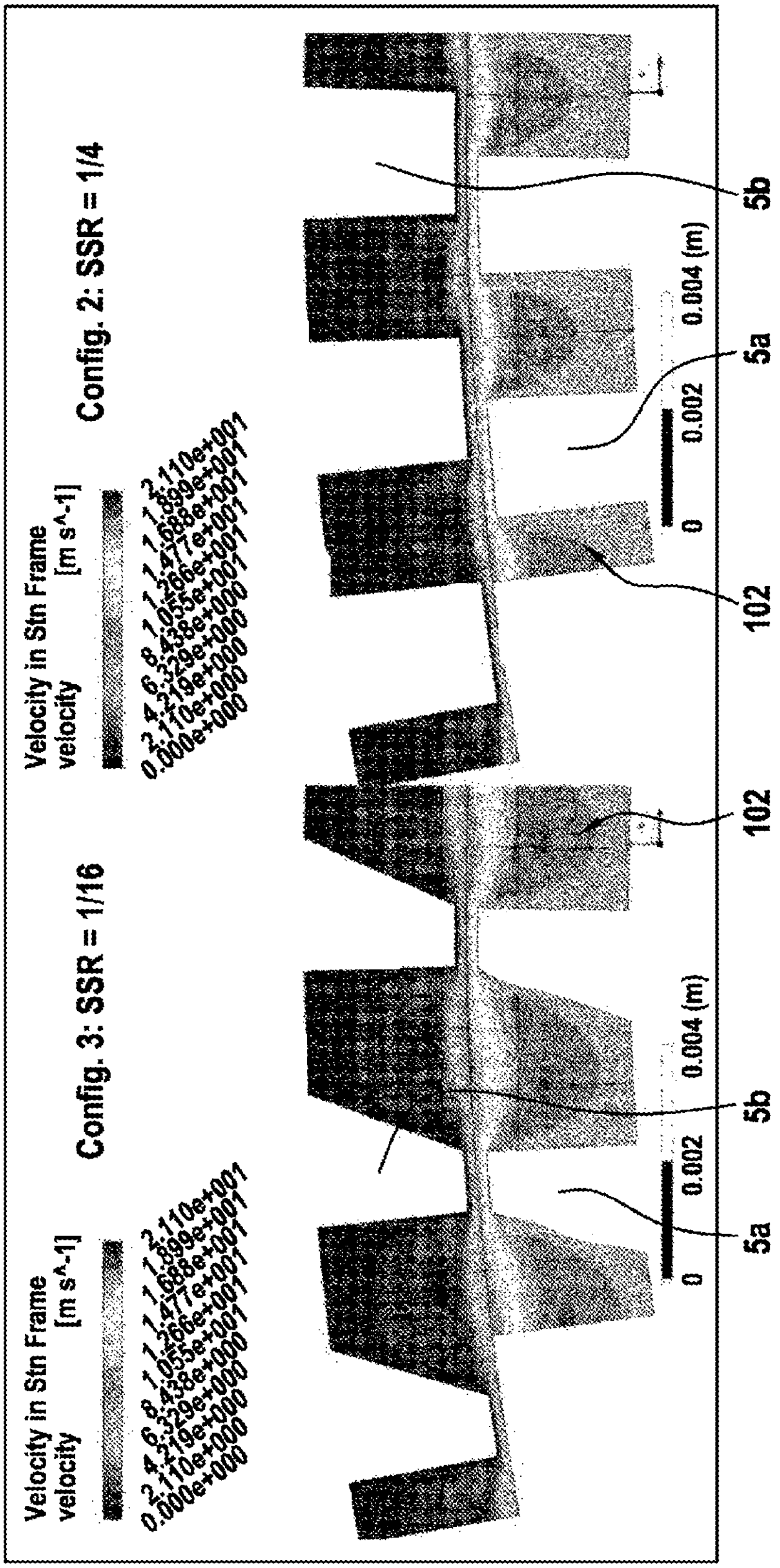
Figure 6B:
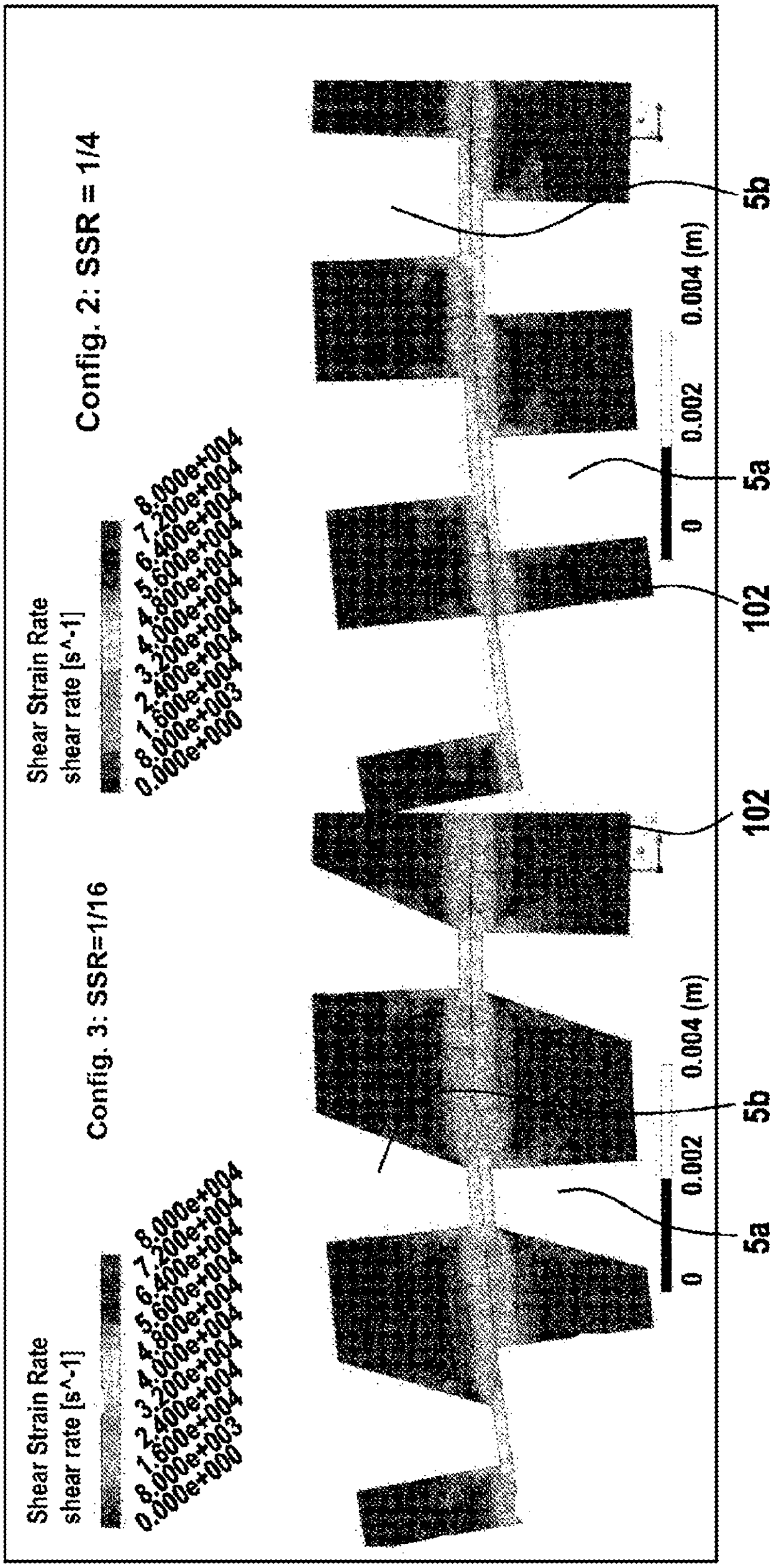
Figure 7A:
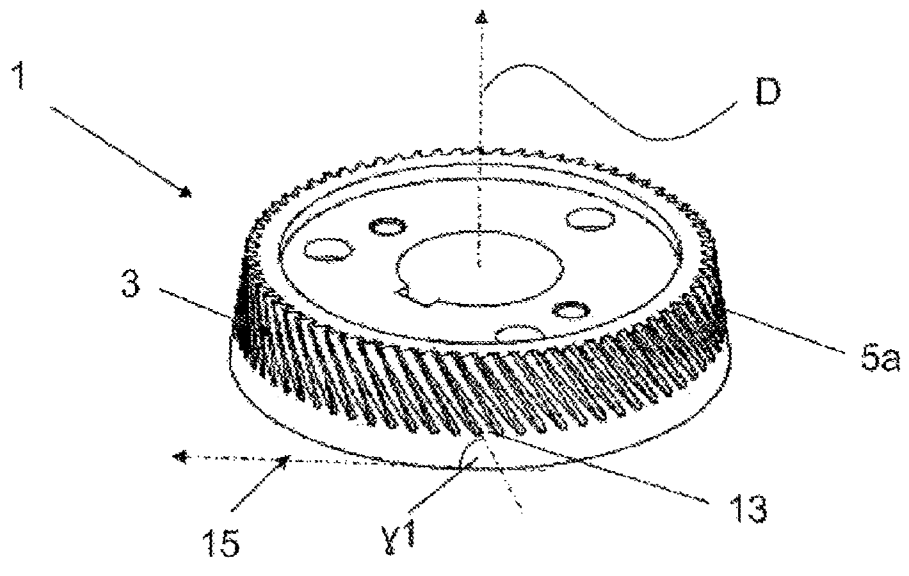
Figure 7B:
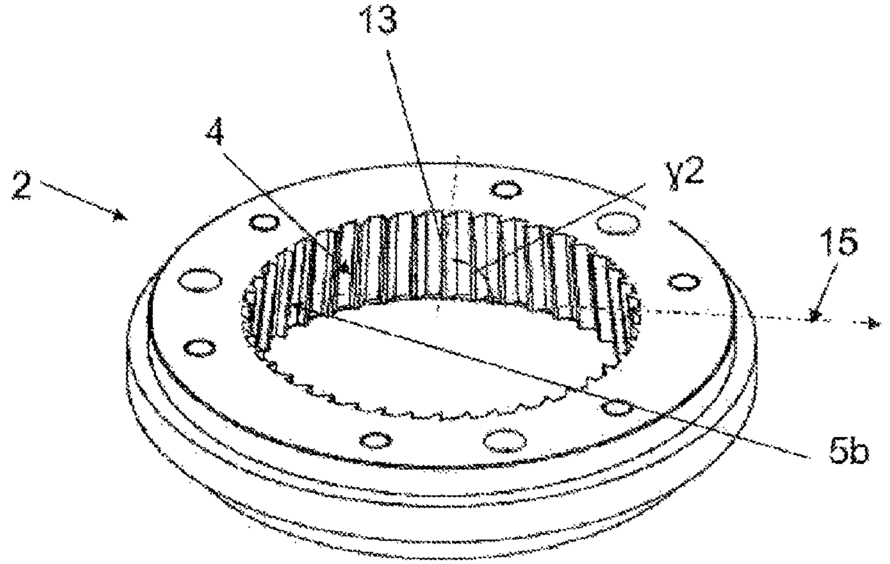
Figure 8:
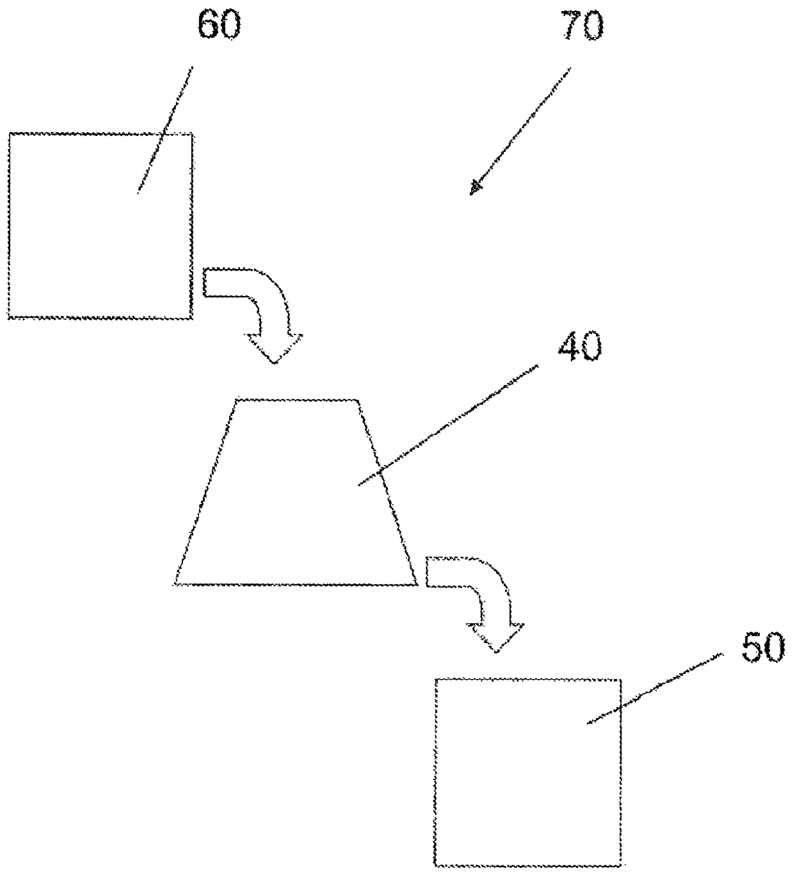

FIGS. **4*a*-4*e*** show schematic representations in plan view of further examples of a stator and a rotor;

FIGS. **5*a*-5*c*** show schematic representations in plan view of further examples of a stator and a rotor;

FIG. **6*a*** shows results for flow rates calculated for two exemplary profiles;

FIG. 6*b* shows results for shear rates calculated for the exemplary profiles according to FIG. 6;

FIG. 7*a* shows an example of a rotor in a perspective view;

FIG. 7*b* shows an example of a stator in a perspective view;

FIG. 8 shows a schematic view of a system.

Figure 1:
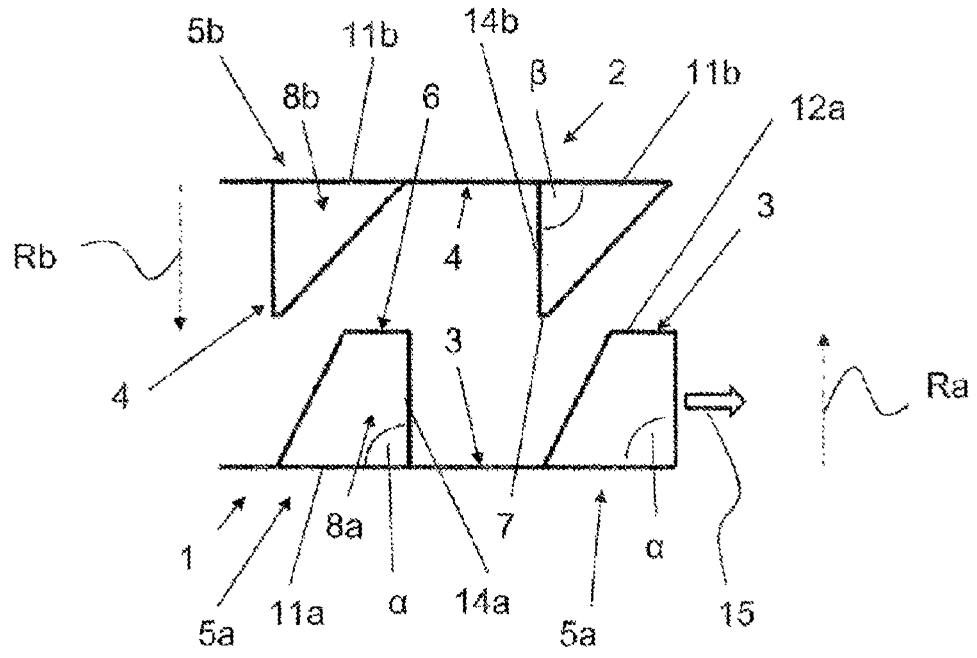
FIG. 1 shows a schematic representation of a detail view of a first example of a stator and a rotor in plan view.

FIG. 1 shows a schematic representation of a detail view of a first example of a rotor 1 and a stator 2 in plan view. The rotor 1 and the stator 2 are arranged coaxially one inside the other, wherein the rotor 1 is arranged within the stator 2 and rotates against the stator 2 in a direction of rotation 15.

The rotor 1 has a rotor grinding surface 3 facing the stator 2, and the stator 2 has a stator grinding surface 4 facing the rotor 1.

The rotor grinding surface 3 has grinding teeth 5*a* with a shearing surface 6, the cross-sectional surfaces 8*a* of which grinding teeth taper, in a plane perpendicular to the axis of rotation D, as shown in the figure, in the radial direction (Ra) toward the opposite stator grinding surface 4. The cross-sectional surface 8*a* has a straight first leg 14*a*, which adjoins a base side 11*a*, running in the circumferential direction 15, of the cross-sectional surface 8*a* and points in the direction of rotation 15 of the rotor 1. The first leg 14*a* encloses an angle α of 90° with the base side 11*a*.

The cross-sectional surfaces 8*a* of the grinding teeth 5*a* on the rotor 1 each form a quadrilateral. This has a longer base side 11*a*, which runs in the circumferential direction, and a shorter base side 12*a*, which is parallel to the first base side and is located on the shearing surface 6 of the respective grinding tooth 5*a*.

The stator grinding surface 4 has grinding teeth 5*b* with a shearing edge 7, the cross-sectional surface 8*b* of which grinding teeth tapers, in a plane perpendicular to the axis of rotation (D), in the radial direction Rb toward the opposite rotor grinding surface 3.

The cross-sectional surface 8*b* has a straight second leg 14*b*, which adjoins a base side 11*b*, running in the circumferential direction, of the cross-sectional surface 8*b*. The second leg 14*b* points counter to the direction of rotation 15 of the rotor (1). The second leg 14*b* encloses an angle β of 90° with the base side 11*b*.

The cross-sectional surfaces 8*b* of the grinding teeth 5*b* on the stator each form a triangle, the tip of which points in the radial direction Rb and forms a shearing edge 7.

Figure 2:
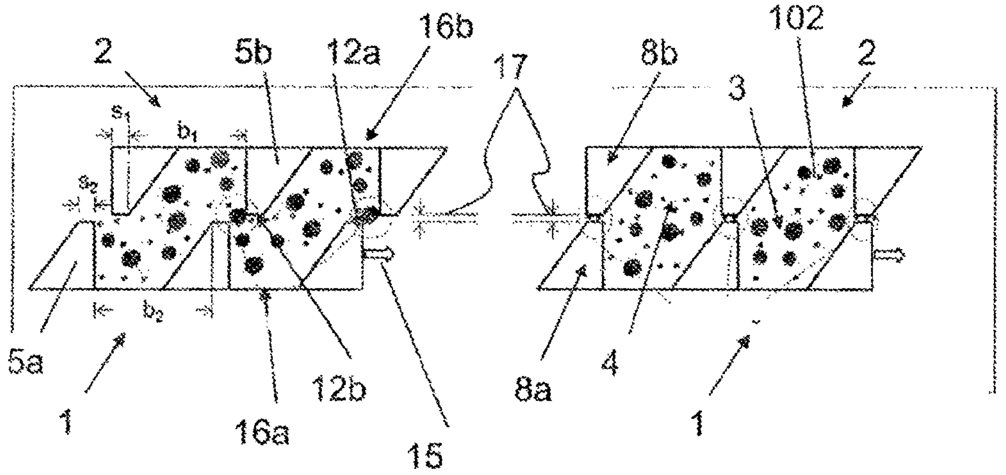
FIG. 2 shows schematic representations of detail views in plan view of a second example of a stator and a rotor in two different positions relative to one another.

FIG. 2 shows schematic representations of detail views in plan view of a second example of a stator 2 and a rotor 1 in two different positions relative to one another, wherein the rotor 1 has moved further in the direction of rotation in the second image.

The material 102 to be processed is located between the rotor 1 and the stator 2.

The rotor 1 has grinding teeth 5*a* and the stator has grinding teeth 5*b*, the cross-sectional surfaces of which are quadrangular in both cases.

The shortest distance 17 between the rotor grinding surface 3 and the stator grinding surface 4 is the distance 17 of the grinding teeth 5*a* and 5*b* when they are exactly opposite, as shown in the second image. Since the cross-sectional surfaces 8*a*, 8*b* taper radially, the shear gap, which is defined by the region in which the material 102 must pass through the shortest distance 17, occupies only a comparatively short length proportion of the entire circumferential line.

The value of the shearing surface rate (SSR) indicates the product of the proportion of the smaller base sides 12*a* of the cross-sectional surfaces 8*a* of grinding teeth 5*a* of the rotor grinding surface 3 in the circumference of a circle formed by a bottom line 16*a* of the rotor grinding surface 3 around the axis of rotation, and the proportion of the smaller base sides 12*b* of the cross-sectional surfaces 8*b* of grinding teeth 5*b* on the stator 2 on the circumference of a circle formed by the bottom line 16*b* of the stator grinding surface 4 around the axis of rotation.

If the grinding teeth 5*a*, 5*b* are distributed evenly over the circumference, it is sufficient to in each case consider only one grinding tooth 5*a*, 5*b* and the lengths s1+b1 and s2+b2, which each describe the distance of the steep flanks, wherein s1 and s2 are the lengths of the short base sides 12*a* and 12*b*. In this case, the shearing surface rate is s1/(s1+b1)*s2/(s2+b2).

Based on the shearing surface rate SSR, the dissipation and the temperature rise can be calculated.

The dissipation is $$\dot{Q}_{diss}=\eta(\dot{\gamma})\cdot\dot{\gamma}^2\cdot V_G$$

wherein the shear rate is calculated from $$\dot{\gamma}=\frac{4\cdot\pi\cdot n}{60\cdot\left(1-\left(\frac{R_2}{R_1}\right)^2\right)}$$

and the volume in the grinding gap is assumed to be $$V_G=\pi\cdot(R_1^2-R_2^2)\cdot h\cdot SSR.$$

Substituted, this results in $$\dot{Q}_{diss}=\eta(\dot{\gamma})\cdot\dot{\gamma}^2\cdot\pi\cdot(R_1^2-R_2^2)\cdot h\cdot SSR$$

The temperature rise can be determined therefrom as $$\Delta T=\frac{\dot{Q}_{diss}}{\dot{m}\cdot c_p}.$$

In this case, n is the rotational speed in rpm, $R_1$ is the inner radius of the stator in m (see FIG. 5*c*), $R_2$ is the outer radius of the rotor in m (see FIG. 5*c*), h is the shortest distance 17, is the flow rate in kg/h, η is the viscosity of the mass and $c_p$ is the specific heat capacity in J/kg/K.

The temperature increase thus depends linearly on the shearing surface rate.

Figure 3:
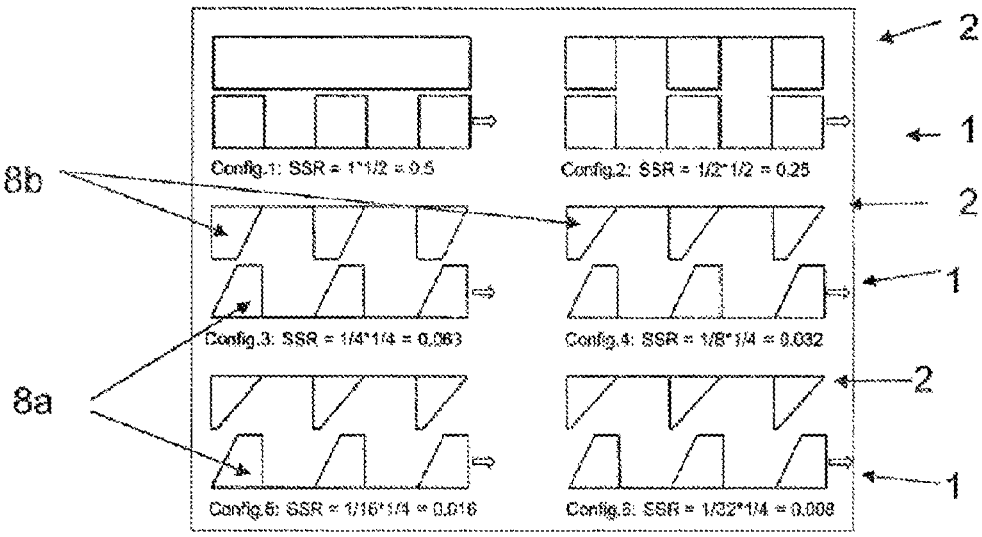
FIG. 3 shows schematic representations in plan view of detail views of various configurations for grinding teeth on a stator and a rotor.

FIG. 3 shows schematic representations in plan view of detail views of various configurations for a stator and a rotor, wherein for each configuration, the stator 2 is shown in the upper half and the rotor 1 is shown in the lower half.

Configurations 1 and 2 show conventional cross-sectional surfaces of grinding teeth that do not taper radially. The corresponding values for the shearing surface rate SSR are large.

The more the cross-sectional surfaces 8*a*, 8*b* taper radially, the smaller the value for the shearing surface rate SSR becomes.

FIGS. 4*a*-4*e* show schematic representations in plan view of further examples of a stator 2 and a rotor 1 arranged coaxially within the stator 2.

The examples have, in each case, different distances 18 between the bottom lines 16*a*, 16*b*, different shortest distances 17 between opposite grinding teeth 5*a*, 5*b*, a different number of grinding teeth 5*a*, 5*b*.

Figure 4A:
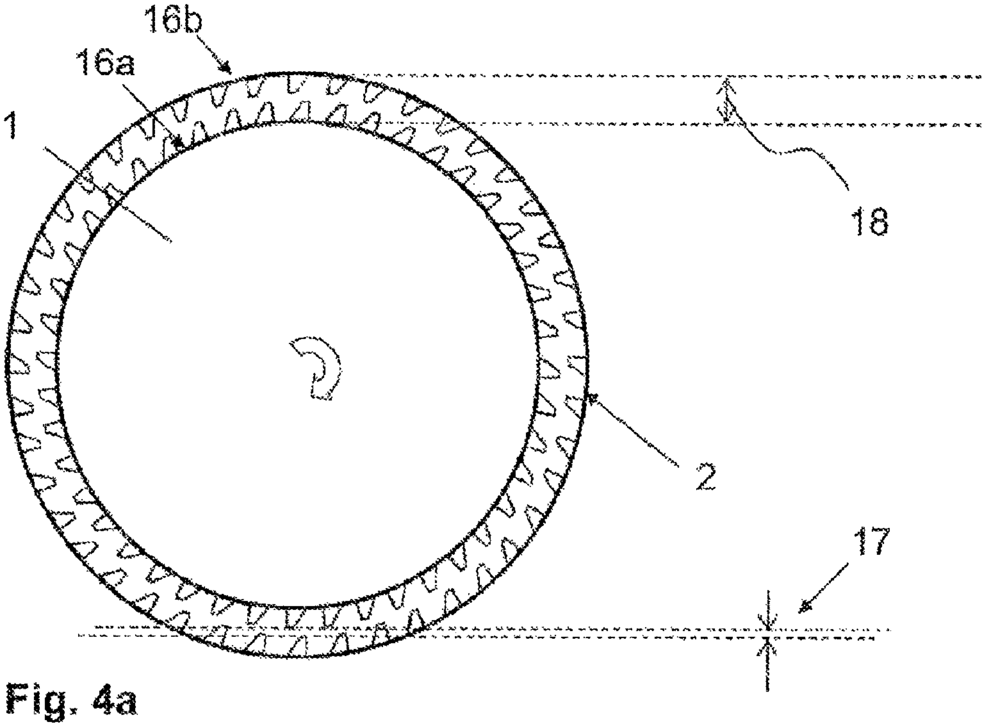
Figure 4B:
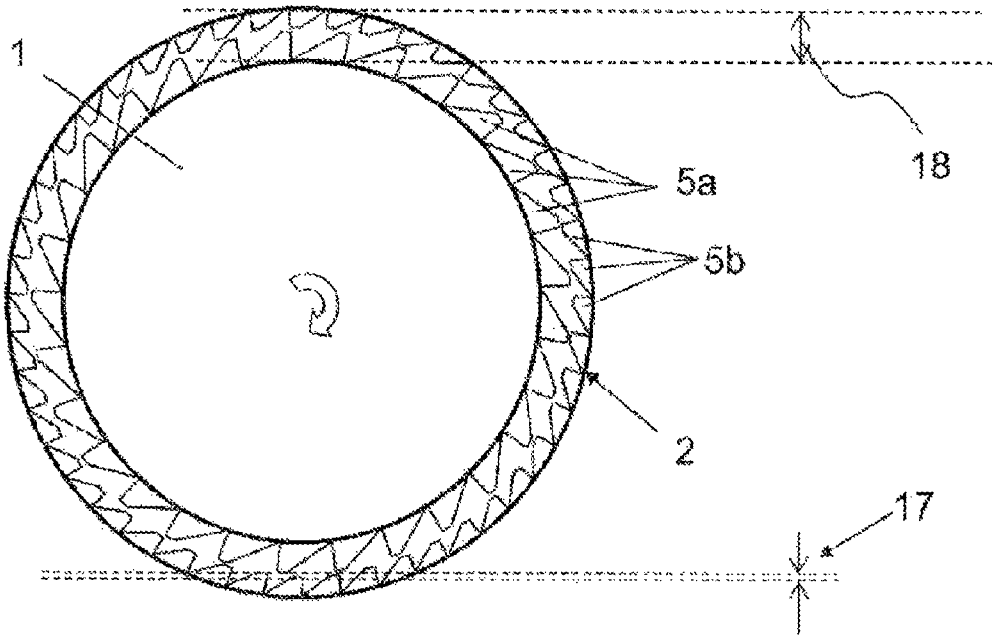

In the example according to FIG. 4*b*, the grinding teeth 5*a*, 5*b* in each case adjoin one another without a distance.

Figure 4C:
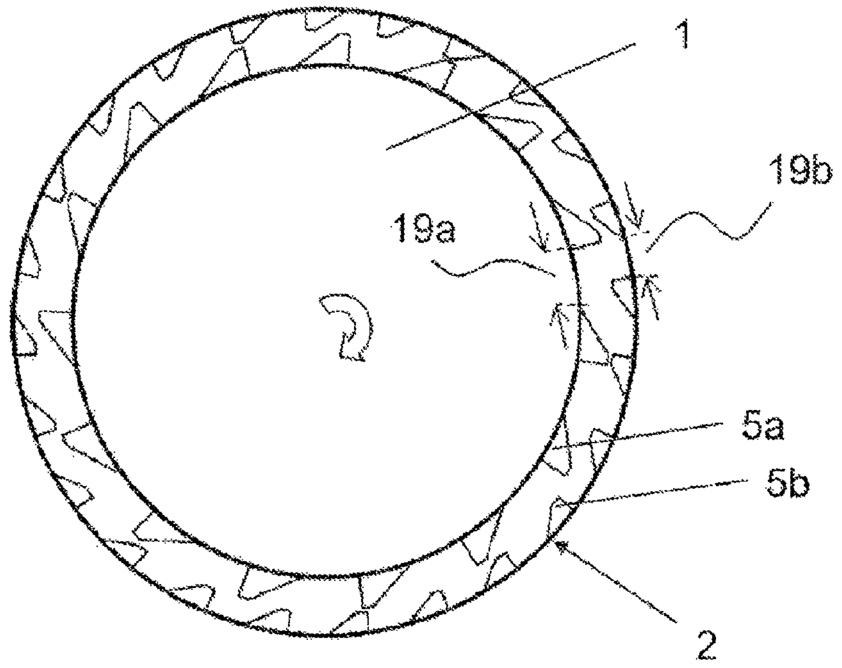

According to FIG. 4*c*, the grinding teeth 5*a*, 5*b* each have a relatively large distance 19*a*, 19*b* from one another in the circumferential direction.

Figure 4D:
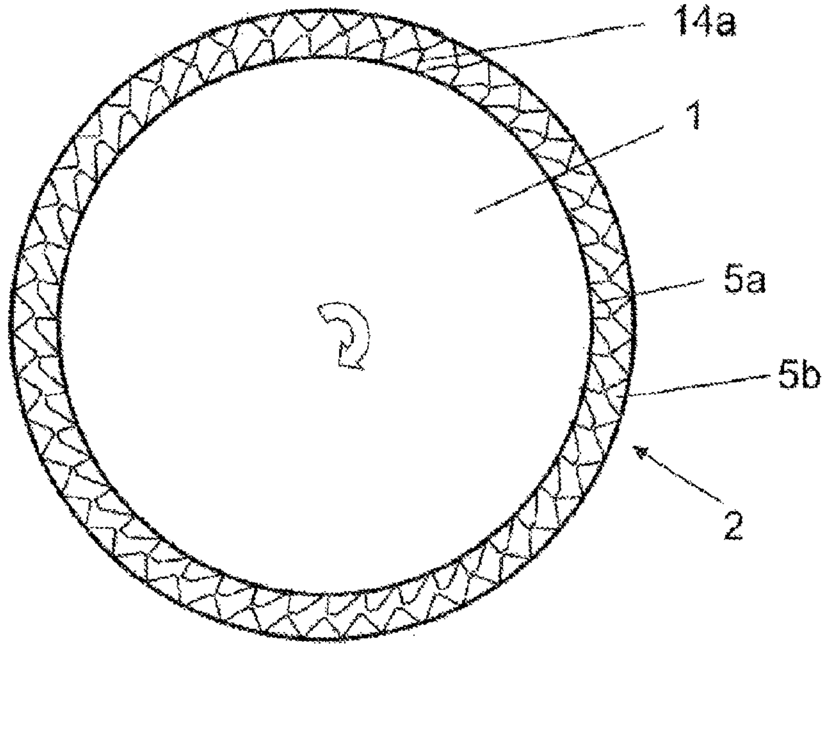

According to FIG. 4*d*, only the legs 14*a* of the grinding teeth 5*a* of the rotor 1 form a steep flank.

Figure 4E:
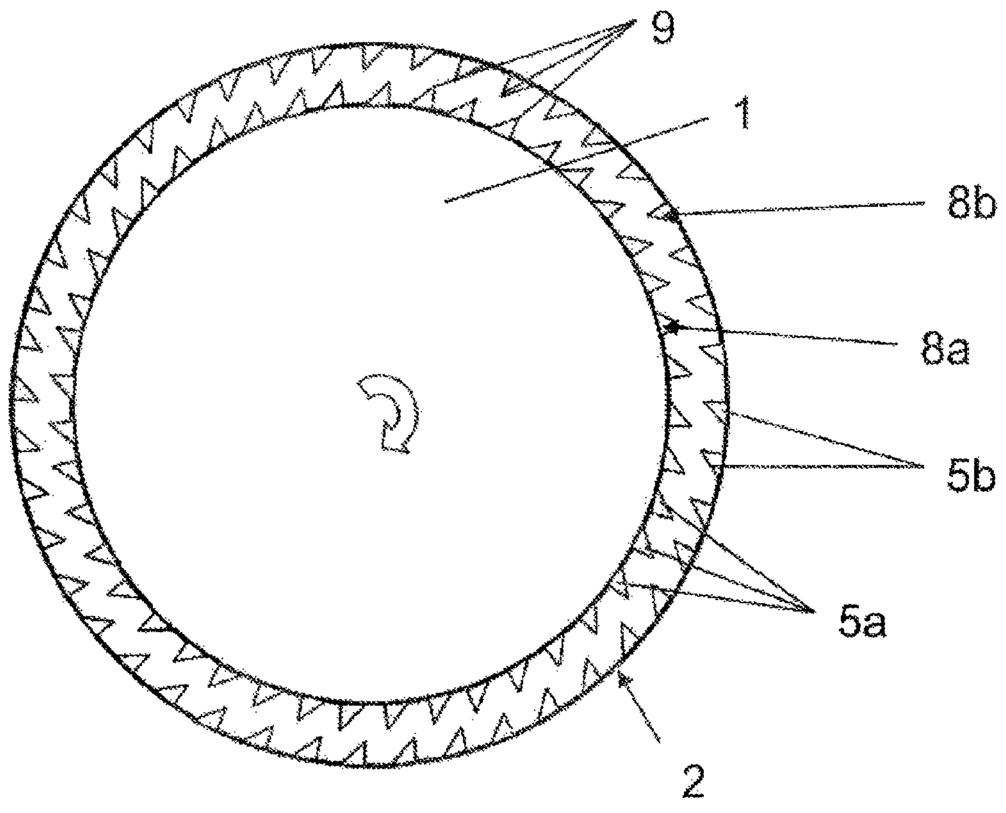

According to FIG. 4*e*, the grinding teeth 5*a*, 5*b* of the stator 2 and of the rotor 1 each have triangular cross-sectional surfaces 8*a*, 8*b*, the tips 9 of which point toward the respectively opposite grinding surface 3, 4.

Figure 5A:
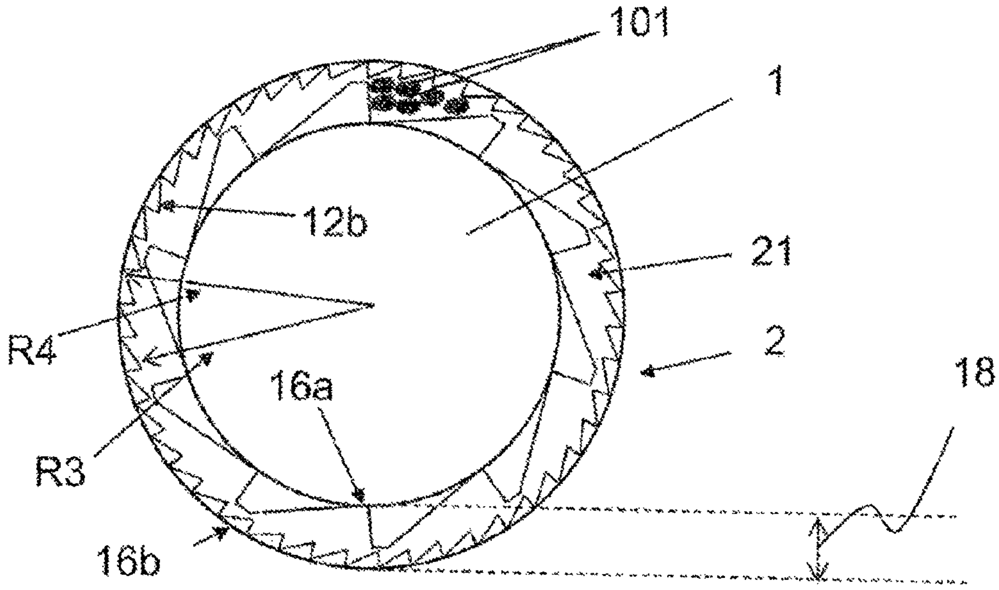
Figure 5B:
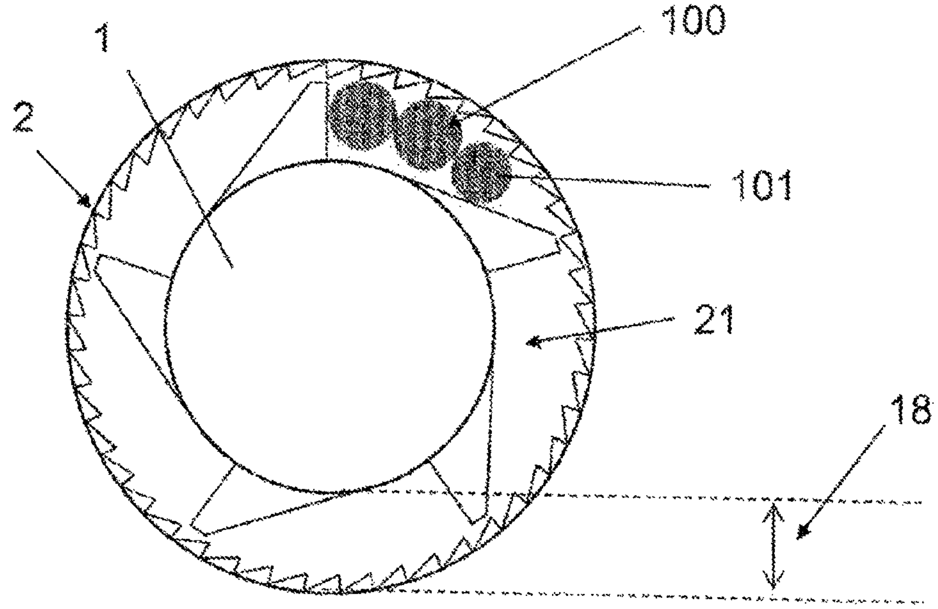
Figure 5C:
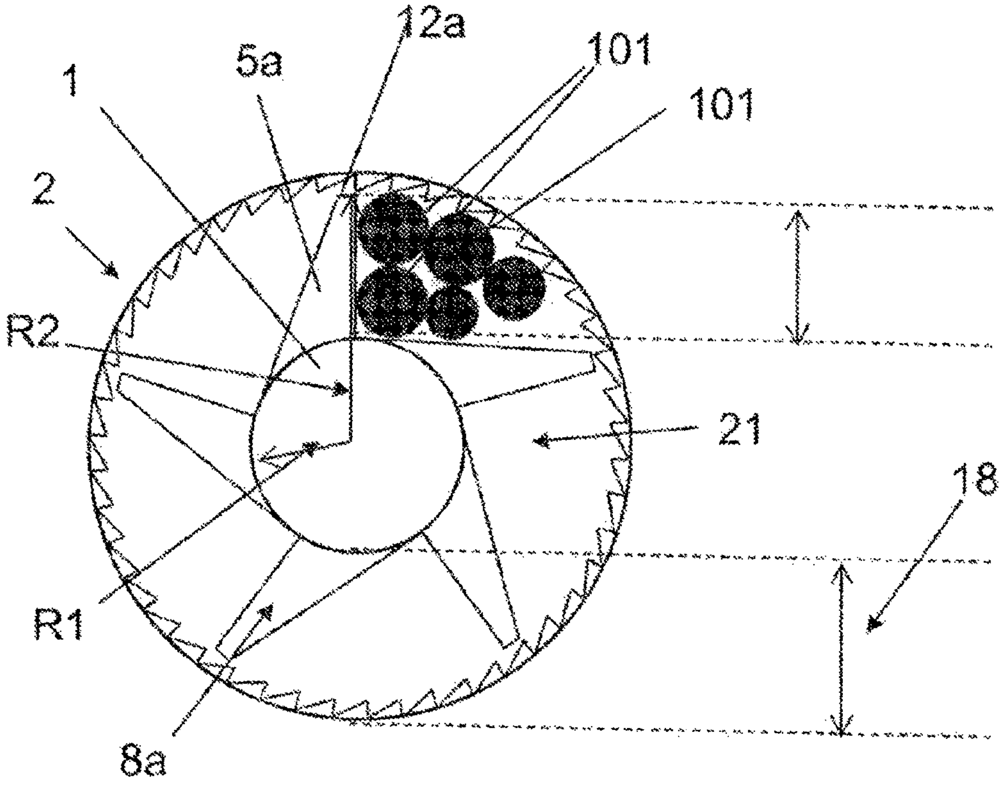

FIGS. 5*a*-5*c* schematic representations in plan view of further examples of a stator 2 and a rotor 1.

The distance 18 between the bottom lines 16*a* and 16*b* (see FIG. 5*a*), the number of grinding teeth 5*a* on the rotor 1 and the radial extension 20 of the rotor grinding teeth 5*a* are selected such that the area 21 between the cross-sectional surfaces 8*a* of two circumferentially adjacent grinding teeth 5*a*, in a plane perpendicular to the axis of rotation, as shown in the figures, provides space for the cross-sectional surfaces 100 of 3-10 particles 101.

The cross-sectional surfaces 8*a* of the grinding teeth 5*a* of the rotor preferably comprise a proportion of less than 50% in a circular ring with inner radius $R_3$ and outer radius $R_2$, wherein the inner radius $R_3$ is the distance of the bottom line 16*a* from the axis of rotation and the outer radius $R_2$ is the distance of the shorter base side 12*a* from the axis of rotation, i.e., corresponds to the outer radius of the rotor 1 (see FIG. 5*c*).

The cross-sectional surfaces 8*b* preferably comprise a proportion of less than 50% in a circular ring with inner radius $R_1$ and outer radius $R_4$, wherein the inner radius $R_1$ is the distance of the shorter base side 12*b* from the axis of rotation, thus corresponds to the inner radius of the stator 2, and the outer radius $R_4$ is the distance of the bottom line 16*b* from the axis of rotation (see FIG. 5*a*).

FIG. 6*a* shows results calculated for two exemplary profiles for flow rates of material 102 between grinding teeth 5*a*, 5*b*. The left image corresponds to the configuration 3 of FIG. 3; the right image corresponds to the configuration 2 of FIG. 3.

The flow rates indicated by different coloring were obtained by a computer simulation of the fluid dynamics according to the Herschel-Bulkley model.

It is found that larger areas with higher speeds are achieved with the profile according to the invention (left image) and a small SSR value than for a conventional profile (right image). This indicates higher mass transfer and better comminution effect.

FIG. 6*b* shows results calculated for the exemplary profiles according to FIG. 6*a* for shear rates of material 102 between grinding teeth 5*a*, 5*b*.

The shear rates indicated by different coloring were obtained by a computer simulation of the fluid dynamics according to the Herschel-Bulkley model.

It is found that smaller areas with higher shear rates are achieved with the profile according to the invention (left image) and a small SSR value than for a conventional profile (right image). This indicates less heating of the material 102.

FIG. 7*a* shows an example of a rotor 1 in a perspective view.

The rotor 1 has a conical basic shape.

The grinding teeth 5*a* on the rotor grinding surface 3 are formed as ribs 13, which enclose an angle γ1 of less than 90° with the direction of rotation 15 and are thus inclined.

FIG. 7*b* shows an example of a stator 2 in a perspective view.

The stator grinding surface 4 has a conical basic shape.

The grinding teeth 5*b* are formed as ribs 13, which enclose an angle γ2 of less than 90° with the direction of rotation 15.

Table 1 below shows results for the comminution of peanuts with a conventional colloid mill, which has grinding teeth according to the configuration 3 of FIG. 3. Peanuts have a high fat content, approximately 49%, so that fat does not need to be added.

TABLE 1

| | Colloid mill | | Flow | | Temp. Mass | | | T. reduction | | Energy |
|---|---|---|---|---|---|---|---|---|---|---|
| | Gap | | rate | Power | [° C.] | | ΔT | new vs Old | | consumption |
| Prodct | [mm] | rpm | [kg/h] | [kW] | Inlet | Outlet | [° C.] | [° C.] | [%] | [kW/t] |
| Peanut | 0.45 | 2950 | 624 | 14 | 27 | 67 | 40 | — | — | 22 |
| Peanut | 0.25 | 2950 | 684 | 19 | 27 | 70 | 43 | — | — | 28 |
| Peanut | 0.05 | 2950 | 657 | 19 | 27 | 77 | 50 | — | — | 29 |

The shortest distance 17 or grinding gap (referred to here as "gap"), the flow rate in kg/h, the power in kW, the temperature of the material at the material inlet ("inlet") and the temperature of the material at the product outlet ("outlet") in ° C., the difference between them, and also the energy consumption in kW/t are listed.

Depending on the grinding gap, the material is heated by more than 40° C.

Table 2 below shows results for the comminution of peanuts with a colloid mill according to the invention.

TABLE 2

| | Colloid mill | | Flow | | Temp. Mass | | | T. reduction | | Energy |
|---|---|---|---|---|---|---|---|---|---|---|
| | Gap | | rate | Power | [° C.] | | ΔT | new vs Old | | consumption |
| Prodct | [mm] | rpm | [kg/h] | [kW] | Inlet | Outlet | [° C.] | [° C.] | [%] | [kW/t] |
| Peanut | 0.45 | 2950 | 893 | 19 | 27 | 54 | 27 | −13 | −33% | 21 |
| Peanut | 0.25 | 2950 | 1100 | 20 | 27 | 59 | 32 | −11 | −26% | 18 |
| Peanut | 0.25 | 2950 | 1062 | 20 | 27 | 56 | 29 | −14 | −33% | 19 |
| Peanut | 0.05 | 2950 | 850 | 20 | 27 | 61 | 34 | −16 | −32% | 24 |
| Peanut | 0.05 | 2950 | 780 | 20 | 27 | 62 | 25 | −15 | −30% | 26 |

The same values as in Table 1 are listed, and additionally also the reduction of the temperature difference compared to the conventional colloid mill with the same grinding gap.

It can be clearly seen that not only does less heating occur, a higher flow rate is also a lower energy consumption.

FIG. 8 shows a schematic view of a system 70 comprising a mixer 60, a colloid mill 40 and a ball mill 50.

The invention claimed is:

1. A colloid mill for reducing a particle size of particles suspended in a first liquid, or a droplet size of a second liquid emued in a first liquid, having at least one rotor and at least one stator, which are arranged coaxially one inside the other, wherein the colloid mill has at least one material inlet for introducing particles, a liquid, a suspension or emulsion on a first axial side and at least one product outlet for conducting away the suspension or emulsion on a second axial side, wherein the at least one rotor has a rotor grinding surface facing toward the stator, and the at least one stator has a stator grinding surface facing toward the rotor, wherein at least one or more of:

the rotor grinding surface has at least one grinding tooth with at least one or more of a shearing surface and shearing edge, wherein the cross-sectional surface of the grinding tooth of the rotor grinding surface tapers, in a plane perpendicular to the axis of rotation, in the radial direction toward the opposite stator grinding surface, wherein the cross-sectional surface has a first leg, which adjoins a base side, running in the circumferential direction, of the cross-sectional surface, points in the direction of rotation of the rotor, encloses an angle of 80°-100°, with the base side, and the stator grinding surface has at least one grinding tooth with at least one or more of a shearing surface or shearing edge, the cross-sectional surface of which grinding tooth tapers, in a plane perpendicular to the axis of rotation, in the radial direction toward the opposite rotor grinding surface, wherein the cross-sectional surface has a second leg which adjoins a base side, running in the circumferential direction, of the cross-sectional surface, wherein the second leg points counter to the direction of rotation of the rotor, and the second leg encloses an angle of 80°-100°, with the base side.

2. The colloid mill according to claim 1, wherein the cross-sectional surface of at least one grinding tooth forms a polygon, which has a longer base side, which runs in the circumferential direction, and a shorter base side, which is parallel to the longer base side and located on a shearing surface of the grinding tooth.

3. The colloid mill according to claim 1, wherein the cross-sectional surface of at least one grinding tooth forms a polygon, the tip of which points toward the opposite grinding surface or the grinding surface to be arranged opposite thereto and located on a shearing edge of the grinding tooth.

4. The colloid mill according to claim 1, wherein the at least one tooth of the rotor grinding surface or the stator grinding surface is formed as a rib with a constantly large cross-sectional surface along its longitudinal extension.

5. The colloid mill according to claim 1, wherein the shortest distance between the rotor grinding surface and the stator grinding surface is between 0.05 mm and 1.2 mm.

6. The colloid mill according to claim 2, wherein the value of a shearing surface rate is less than 0.07, wherein the value of the shearing surface rate indicates the product of the proportion of the smaller base sides of the cross-sectional surfaces of grinding teeth of the rotor grinding surface in the circumference of a circle formed by a bottom of the rotor grinding surface around the axis of rotation, and the proportion of the smaller base sides of the cross-sectional surfaces of grinding teeth on the stator in the circumference of a circle formed by a bottom line of the stator grinding surface around the axis of rotation.

7. The colloid mill according to claim 1, wherein the colloid mill has a housing, and the stator and the housing are not manufactured in one piece so that the stator is exchangeable.

8. System (70) for processing food masses, comprising a colloid mill (40) according to claim 1, which is arranged upstream of a ball mill (50) and downstream of a mixer (60).

9. Method for reducing a particle size of particles suspended in a first liquid, and a droplet size of a second liquid emulsified in a first liquid, wherein the first liquid is a fat mass, in a colloid mill according to claim 1, wherein, in order to form a suspension or emulsion, material is guided along between the stator grinding surface and the rotor grinding surface, from a first axial end of the colloid mill to the second axial end of the colloid mill, wherein the temperature of the material increases by less than 40° C. on the path through the colloid mill.

10. Method according to claim 9, wherein the area between the cross-sectional surfaces of two circumferentially adjacent grinding teeth (5*a*, 5*b*) on the stator grinding surface (4) and the rotor grinding surface (3), in a plane perpendicular to the axis of rotation, provides space for the cross-sectional surfaces (100) of 3-10 particles (101) and droplets.

* * * * *